(12) United States Patent
Dai et al.

(10) Patent No.: US 10,915,168 B2
(45) Date of Patent: Feb. 9, 2021

(54) INPUT METHOD AND APPARATUS OF DEVICE

(71) Applicant: Goertek Inc., Weifang (CN)

(72) Inventors: Tianrong Dai, Weifang (CN); Yuge Zhu, Weifang (CN); Dachuan Zhao, Weifang (CN); Xiang Chen, Weifang (CN)

(73) Assignee: GOERTEK INC., Weifang (CN)

( * ) Notice: Subject to any disclaimer, the term of this patent is extended or adjusted under 35 U.S.C. 154(b) by 362 days.

(21) Appl. No.: 15/761,144

(22) PCT Filed: Nov. 16, 2017

(86) PCT No.: PCT/CN2017/111358
§ 371 (c)(1),
(2) Date: Mar. 19, 2018

(87) PCT Pub. No.: WO2018/223606
PCT Pub. Date: Dec. 13, 2018

(65) Prior Publication Data
US 2019/0354171 A1 Nov. 21, 2019

(30) Foreign Application Priority Data

Jun. 9, 2017 (CN) .......................... 2017 1 0434418

(51) Int. Cl.
*G06F 3/01* (2006.01)
*H04N 19/167* (2014.01)
(Continued)

(52) U.S. Cl.
CPC ......... *G06F 3/013* (2013.01); *G02B 27/0093* (2013.01); *G06K 9/00597* (2013.01); *H04N 19/167* (2014.11); *G06F 2203/011* (2013.01)

(58) Field of Classification Search
CPC .... G06F 3/013; G06F 2203/011; G06F 3/011; G02B 27/0093; G06K 9/00597; H04N 19/167
(Continued)

(56) References Cited

U.S. PATENT DOCUMENTS 10,372,203 B2 * 8/2019 Skogo .................. G06F 3/0304
2012/0319928 A1 12/2012 Rhodes
(Continued)

FOREIGN PATENT DOCUMENTS

| CN | 102611801 A | 7/2012 |
| CN | 102981620 A | 3/2013 |

(Continued)

OTHER PUBLICATIONS

Search Report issued in corresponding Chinese Patent Application No. 2017104344187 (1 page).
(Continued)

*Primary Examiner* — Tuyen Tra
(74) *Attorney, Agent, or Firm* — Buchanan Ingersoll & Rooney PC

(57) ABSTRACT

An input method and apparatus of a device. The method includes: tracking and recording movement of an eyeball gaze point of a user on a display screen of the device, to obtain a current eyeball gaze point movement trajectory; judging whether the current eyeball gaze point movement trajectory matches with a preset eyeball gaze point movement trajectory in a movement trajectory database; wherein the preset eyeball gaze point movement trajectories indicate paths of the movement of the eyeball gaze point on the display screen according to a preset length range within a preset time period; if matched, determining a corresponding input instruction by using the matched eyeball gaze point movement trajectory, and completing an input operation
(Continued)

according to the input instruction; and if not matched, not conducting an input operation. The input method and apparatus of a device can conduct input according to the eyeball movement of the user.

13 Claims, 2 Drawing Sheets

(51) Int. Cl.
   *G02B 27/00* (2006.01)
   *G06K 9/00* (2006.01)
(58) Field of Classification Search
   USPC .................................. 351/200, 205, 209
   See application file for complete search history.

(56) References Cited

U.S. PATENT DOCUMENTS

| | | |
|---|---|---|
| 2013/0300652 A1 | 11/2013 | Raffle et al. |
| 2014/0184475 A1 | 7/2014 | Tantos et al. |
| 2015/0077329 A1 | 3/2015 | Yoon et al. |
| 2016/0366392 A1 | 12/2016 | Raghoebardajal et al. |

FOREIGN PATENT DOCUMENTS

| | | |
|---|---|---|
| CN | 103902029 A | 7/2014 |
| CN | 103930817 A | 7/2014 |
| CN | 104699249 A | 6/2015 |
| CN | 105340279 A | 2/2016 |
| CN | 106464854 A | 2/2017 |
| CN | 106686295 A | 5/2017 |
| CN | 107239144 A | 10/2017 |
| CN | 107333119 A | 11/2017 |
| CN | 106210692 A | 12/2017 |
| WO | WO 2017/035053 A1 | 3/2017 |

OTHER PUBLICATIONS

International Search Report (PCT/ISA/210) dated Feb. 24, 2018, by the Chinese Patent Office as the International Searching Authority for International Application No. PCT/CN2017/111358.

Written Opinion (PCT/ISA/237) dated Feb. 24, 2018, by the Chinese Patent Office as the International Searching Authority for International Application No. PCT/CN2017/111358.

* cited by examiner

INPUT METHOD AND APPARATUS OF DEVICE

CROSS REFERENCE TO RELATED APPLICATIONS

This application is a National Stage entry of International Application No.: PCT/CN2017/111358, filed on Nov. 16, 2017, which claims priority to Chinese Patent Application No. 201710434418.7, filed on Jun. 9, 2017. The entire contents of each of which are incorporated herein by reference.

TECHNICAL FIELD

The present disclosure relates to the field of input technology, and particularly relates to an input method and apparatus of a device.

BACKGROUND ART

In the prior art, some intelligent devices (for example, virtual reality devices) can realize eyeball tracking when they are being used; namely, the cursor on the screen of the virtual reality device moves along with the turning of the eyeball of the user. However, virtual reality devices that support the eyeball tracking function usually only provide the coordinate of the gaze point to facilitate positioning the cursor, and an external input device is needed to complete the input operations. The efficiency of this kind of input operation is low. In addition, eye movements such as twinkling, eye closing, squinting and eyeball turning have been used to complete instruction input, but it is difficult to distinguish such kind of input operation from normal eyeball activities of the user, and thus misoperations may easily occur when input operations are conducted by tracking eyeball movements, which affects the input accuracy.

SUMMARY OF THE DISCLOSURE

The present disclosure provides an input method and apparatus of a device, which improves the input accuracy and efficiency of the device.

According to an aspect of the present disclosure, there is provided an input method of a device, comprising:

tracking and recording movement of an eyeball gaze point of a user on a display screen of the device, to obtain a current eyeball gaze point movement trajectory;

judging whether the current eyeball gaze point movement trajectory matches with a preset eyeball gaze point movement trajectory in a movement trajectory database; wherein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories corresponds to an input instruction respectively;

if the current eyeball gaze point movement trajectory matches with a preset eyeball gaze point movement trajectory, determining a corresponding input instruction by using the matched eyeball gaze point movement trajectory, and completing an input operation according to the input instruction; and if the current eyeball gaze point movement trajectory does not match with the preset eyeball gaze point movement trajectories, not conducting an input operation.

According to another aspect of the present disclosure, there is provided an input apparatus of a device, comprising:

a tracking and recording module, adapted for tracking and recording movement of an eyeball gaze point of a user on a display screen of the device, to obtain a current eyeball gaze point movement trajectory;

a judging module, adapted for judging whether the current eyeball gaze point movement trajectory matches with a preset eyeball gaze point movement trajectory in a trajectory database; wherein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories corresponds to an input instruction respectively; and an input determining module, adapted for, if the current eyeball gaze point movement trajectory matches with a preset eyeball gaze point movement trajectory, determining a corresponding input instruction by using the matched eyeball gaze point movement trajectory, and completing an input operation according to the input instruction; and if the current eyeball gaze point movement trajectory does not match with the preset eyeball gaze point movement trajectories, not conducting an input operation.

According to yet another aspect of the present disclosure, there is provided an input apparatus of a device, comprising a processor and a memory, wherein the memory stores machine executable instruction code, and the processor communicates with the memory, and reads and executes the instruction code stored in the memory, to implement the above input operation of the device.

The advantageous effects of the present disclosure are as follows. According to the input method and apparatus of a device of the embodiments of the present disclosure, movement of a fixation point of eyeballs of a user on a display screen of the device is tracked and recorded, to obtain a current eyeball gaze point movement trajectory, the current eyeball gaze point movement trajectory is matched with preset eyeball gaze point movement trajectories in a movement trajectory database, and if they match, a corresponding input instruction is determined according to the matched preset eyeball gaze point movement trajectory, and the input is completed according to the input instruction. Because in the present embodiment, the preset eyeball gaze point movement trajectories indicate paths of the movement of the eyeball gaze point on the display screen according to a preset length range within a preset time period, the normal eyeball staring activities of the user can be distinguished from the staring activities of purposeful input operations, thereby improving the efficiency of the input operations, ensuring input accuracy, satisfying the user demands and improving the market competitiveness of the device.

DETAILED DESCRIPTION

The invention concept of the present disclosure is as follows. With respect to the problem of the prior art that the input modes of virtual reality devices have low efficiency and poor accuracy, the present disclosure proposes an input solution in which, a trajectory database is established in advance; a plurality of preset eyeball gaze point movement trajectories are recorded in the movement trajectory database, wherein the preset eyeball gaze point movement trajectories indicate paths of the movement of the eyeball gaze point on the display screen according to a preset length range within a preset time period; a corresponding input instruction is constructed for each of the preset eyeball gaze point movement trajectories; the eyeball movement of the user is detected and recorded, and when the acquired current eyeball gaze point movement trajectory matches with one of the preset eyeball gaze point movement trajectories, which indicates that the user wants to execute a specific input operation, a corresponding input instruction is determined according to the matching relationship to complete the input. Compared with the prior art in which other input devices (such as touchpad keys or operating handles) are required to complete the input of virtual reality devices, the present disclosure greatly improves the input efficiency, and prevents misidentifying the normal eyeball staring activities of the user as the eyeball input operations of the user, which improves the input accuracy and satisfies the user demands.

Figure 1:
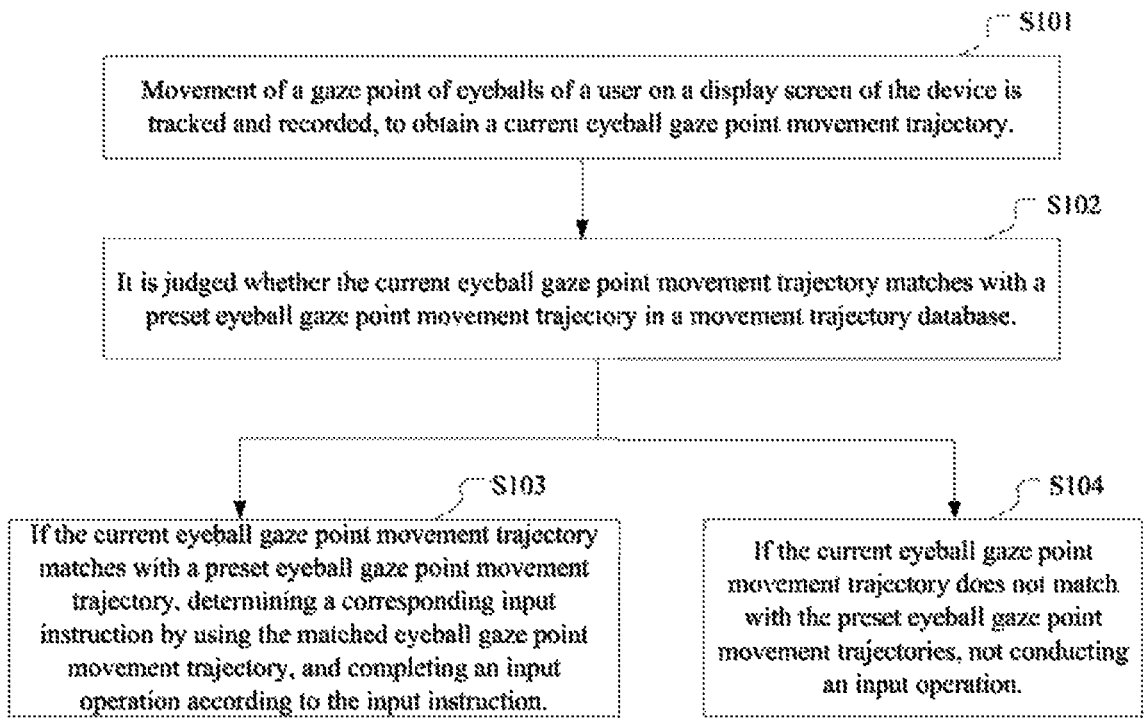
FIG. 1 is a schematic flow diagram of an input method of a device in accordance with an embodiment of the present disclosure.

As shown by FIG. 1, the input method of a device of the present embodiment comprises the following steps:

Step S101, movement of a gaze point of eyeballs of a user on a display screen of the device is tracked and recorded, to obtain a current eyeball gaze point movement trajectory.

Step S102, it is judged whether the current eyeball gaze point movement trajectory matches with a preset eyeball gaze point movement trajectory in a movement trajectory database; and Step S103 or Step S104 is executed correspondingly according to the different judgment results.

Herein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories respectively corresponds to an input instruction.

Step S103, if the current eyeball gaze point movement trajectory matches with a preset eyeball gaze point movement trajectory, a corresponding input instruction is determined by using the matched eyeball gaze point movement trajectory, and an input operation is completed according to the input instruction.

Step S104, if the current eyeball gaze point movement trajectory does not match with the preset eyeball gaze point movement trajectories, an input operation will not be conducted.

It can be known from FIG. 1 that, the input method of a device of the present embodiment acquires the current eyeball gaze point movement trajectory, judges whether the current eyeball gaze point movement trajectory matches with a preset eyeball gaze point movement trajectory in a movement trajectory database; and if they match, which indicates that the user wants to conduct an input operation, determines the input instruction according to the preset eyeball gaze point movement trajectory, to complete the input. The method does not only improve the input efficiency of the device but also avoids misidentification, which ensures the input accuracy, and improves the user experience and market competitiveness of the device.

The implementing steps of the input method of a device of the present disclosure are described in further detail below by referring to FIG. 2. The present embodiment describes the input method by taking a virtual reality device as an example of the device.

First, in the technical solution of the present embodiment, a movement trajectory database is constructed and maintained. The movement trajectory database records preset eyeball gaze point movement trajectories. All of the preset eyeball gaze point movement trajectories satisfy two conditions: the first is the time condition, namely, the preset eyeball gaze point movement trajectories are trajectories of movements completed within a preset time period; and the second is the preset length range condition, namely, all of the preset eyeball gaze point movement trajectories are trajectories of movements based on a preset length range.

It should be noted that, the preset length range is determined according to the preset radius length, and the preset radius length is obtained by calculating according to number of pixels that are determined according to a field of view of the display screen of the device, a corresponding preset sight line angle and a resolution of the display screen. The preset sight line angle refers to a sight line angle formed by moving a distance of the preset radius length from the current point on the display screen in a preset direction.

In display systems, field of view (FOV) is the angle between the connecting lines of the edges of the display screen and the observation point (namely, the eyes of the user). Within the range in which the head keeps still, the range defined by the upper limit of the display screen that can be seen when looking upward and the lower limit of the display screen that can be seen when looking downward is the vertical field of view, and the range defined by the left limit of the display screen that can be seen when looking leftward and the right limit of the display screen that can be seen when looking rightward is the horizontal field of view. The field of view of virtual reality devices generally refers to the horizontal field of view. The number of pixels corresponding to each degree of the field of view can be calculated out according to the field of view of the display screen of the device (for example a horizontal field of view of 100 degrees) and the acquired resolution of the display screen (1200×1080). As a person skilled in the art knows, the resolution of a display screen is the number of pixels displayed on the screen, and the resolution of 1200×1080 means that there are 1200 pixel points in the horizontal direction, and 1080 pixel points in the vertical direction. By calculating, 1200÷100=12, it can be known that the number of the pixel points corresponding to each degree of the angle of the field of view is 12. If a preset sight line angle is 10 degree, it can be calculated out that the number of pixels that are corresponding to the preset sight line angle are 12×10=120. If within a preset duration (for example 0.5 second), the eyeball gaze point of the user moves out of the first preset range defined by the first preset radius length (for example 120 pixel points) from the current point in a preset direction, and moves back to the second preset range around the current point defined by the second preset radius length (for example 30 pixel points), it is determined as a preset eyeball gaze point movement trajectory, and a corresponding input operation can be conducted.

In the embodiments of the present disclosure, the reason that the movement trajectories of the eyeball gaze point are preset according to the time condition and the preset length range condition is as follows. Namely, the inventors of the present disclosure find that the technical solution of the prior art of completing input by tracking the eyeball movement has the problem of easily misidentifying the normal eyeball staring activity of the user as an eyeball activity instructing an input operation. For example, when judging whether the user wants to make a selecting operation according to the duration of the eyeballs of the user staring at an target, it is difficult to distinguish the activity of the user staring at a certain target for a short period of time from the activity of purposefully staring at a target to conduct input, and misidentification easily occurs.

However, in the present disclosure, by setting the time condition and the preset length range condition, and recording the trajectories formed by eyeball staring activities that simultaneously satisfy the time condition and the preset length range condition in the movement trajectory database as the preset eyeball gaze point movement trajectories, it becomes possible to subsequently conduct input on the basis of the matching result of the preset eyeball gaze point movement trajectories to improve the accuracy of the input operation.

Herein, the preset eyeball gaze point movement trajectories comprise: a preset eyeball gaze point straight movement trajectory and a preset eyeball gaze point curved movement trajectory.

Figure 2:
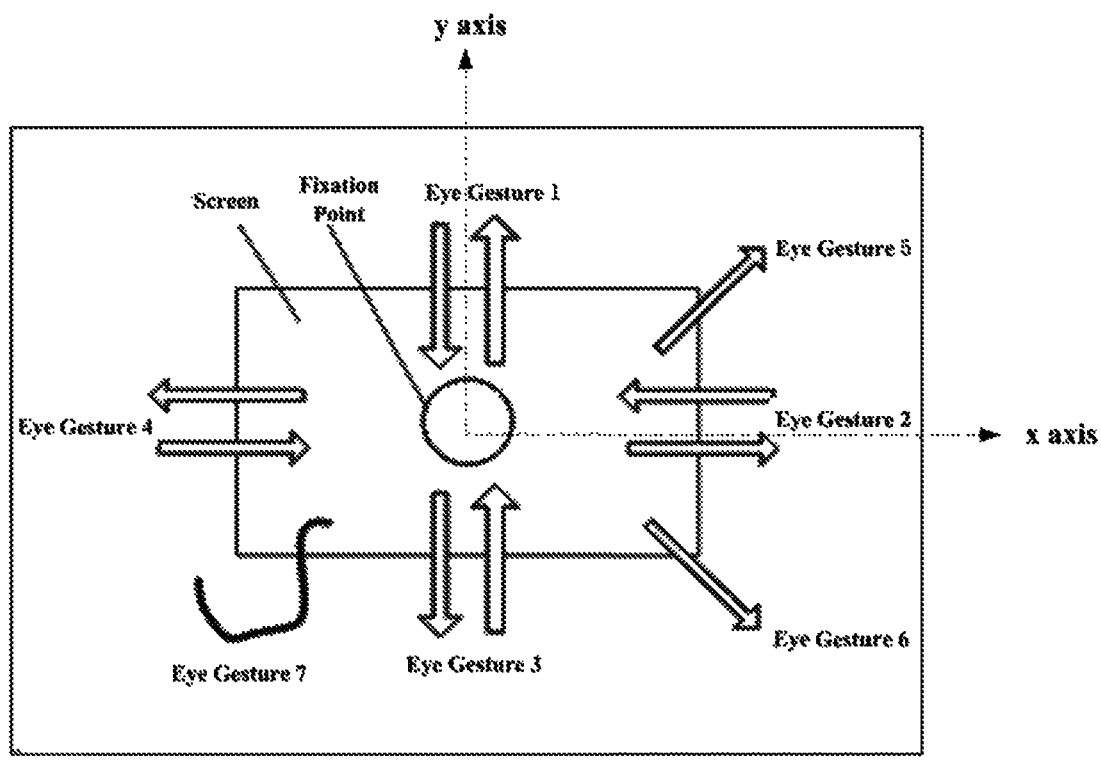
FIG. 2 is a schematic diagram of a preset eyeball movement trajectory in accordance with an embodiment of the present disclosure.

FIG. 2 schematically shows the screen of the virtual reality device and the eyeball gaze point, and additionally schematically shows seven eye gestures. The so-called eye gesture is the preset eyeball gaze point movement trajectories. In the input method of the embodiments of the present disclosure, the concept of eye gesture is introduced, and the regular movement trajectories of the eyeball gaze point are preset as eye gesture operations. Particularly, a trajectory that the eyeball gaze point moves beyond a certain angle threshold (for example 10 degrees) in a specific direction from the current staring position and quickly (for example within 0.5 second) moves back to the preset range around the original staring position (for example 2 degrees) is defined as an eye gesture operation. The movement in four directions, namely, upward, downward, leftward and rightward movement may be defined as four eye gesture operations (such as the eye gestures 1-4 as shown in FIG. 2). The eye gesture operations may also be curved movement trajectories (such as the eye gesture 7). In practical applications, the specific eye gesture operations may be effectively distinguished form the gaze point activities of the user in the normal state by setting an angle threshold and a time threshold, which improves the accuracy of input operations using the eyeball tracking technique.

In some embodiments of the present disclosure, the preset eyeball gaze point straight movement trajectory comprises: a path indicating that the eyeball gaze point within a preset time period, from a current point on the display screen, moves out of a first preset range defined by a first preset radius length in a straight line, and moves back to a second preset range around the initial point defined by a second preset radius length. The second preset radius length is less than the first preset radius length, and the current point is a circle center of both the first preset range and the second preset range.

In other words, a time period (for example 0.5 second) is set first, then the duration in which the eyeball gaze point of the user moves out of the first preset range defined by the first preset radius length from the current point on the display screen in a specific direction and in a straight line and moves back to the second preset range around the starting point (namely, the above current point) defined by the second preset radius length is calculated, and the duration and the preset time period are compared to determine whether it is an eyeball activity for controlling an input operation.

In addition, in order to facilitate the user to operate, in consideration of the regularity of eyeball activities of users, in the present embodiment, the preset eyeball gaze point straight movement trajectory comprises a path indicating that the eyeball gaze point moves out of the first preset range defined by the first preset radius length from the current point on the display screen in a direction and in a straight line.

Here, the direction is one of the directions defined as follows: a positive direction of a horizontal axis (namely, the leftward direction), a negative direction of a horizontal axis (namely, the rightward direction), a positive direction of a vertical axis (namely, the upward direction) and a negative direction of a vertical axis (namely, the downward direction) in a rectangular plane coordinate system established by using the display screen as a reference plane and the current point as an origin; and an inclined direction (namely, the inclined direction) that forms an angle in a preset direction with the horizontal axis or the vertical axis of the rectangular plane coordinate system (for example, forms an angle of 45 degrees with the positive direction or the negative direction of the horizontal axis), such as the eye gesture 5 and the eye gesture 6 in FIG. 2.

For example, the eye gesture 1 shown in FIG. 2 is a preset eyeball gaze point straight movement trajectory, and it indicates the path that the eyeball gaze point moves upward out of the first preset range defined by the first preset radius length from the current point on the display screen in a straight line and moves back to the second preset range around the starting point (namely, the above current point) defined by the second preset radius length in a straight line within the preset time period. The calculating of the preset radius lengths here has been described above, and they refer to the numbers of pixels that are determined according to a field of view of the display screen of the device, a corresponding preset sight line angle and a resolution of the display screen, the preset sight line angle here refers to a sight line angle formed when moving a distance of the preset radius length from the current point on the display screen in a preset direction.

Furthermore, the movement trajectory database further includes preset eyeball gaze point curved movement trajectory, and the preset eyeball gaze point curved movement trajectory comprises a path indicating that the eyeball gaze point moves from a current point on the display screen in a predefined curve within a preset time period. The eye gesture 7 shown in FIG. 2 is a preset eyeball gaze point curved movement trajectory.

It should be noted that, the eye gestures in FIG. 2 are merely illustrative examples, and the preset eyeball gaze point movement trajectories of the embodiments of the present disclosure are not limited thereto, and may be predefined according to demands. For example, a preset eyeball gaze point curved movement trajectory may be predefined to be a path that is obtained by drawing an arc or a circle whose radius is not less than a preset value clockwise or anti-clockwise within a preset time period, with the current point as the origin. The preset curved movement trajectory is acceptable as long as it can surely distinguish the normal activities of the eyeball gaze point of the user from the purposeful activities of the eyeball gaze point for completing input operations.

After the movement trajectory database is constructed and corresponding input instructions (here the input instructions include: direction instructions such as upward instruction and downward instruction, and confirmation instruction and cancellation instruction) are set for the preset eyeball gaze point movement trajectories in the movement trajectory database, the virtual reality device tracks and records movement of an eyeball gaze point of a user on a display screen of the device to obtain a current eyeball gaze point movement trajectory by using the input method of the embodiments of the present disclosure, when the eyeball tracking input function is turned on. Then, the virtual reality device judges whether the current eyeball gaze point movement trajectory matches with a preset eyeball gaze point movement trajectory in a trajectory movement database; if the current eyeball gaze point movement trajectory matches with a preset eyeball gaze point movement trajectory, a corresponding input instruction is determined by using the matched eyeball gaze point movement trajectory, and an input operation is completed according to the input instruction; if the current eyeball gaze point movement trajectory does not match with the preset eyeball gaze point movement trajectories, an input operation will not be conducted.

In an implementing mode, the method of the embodiments of the present disclosure further comprises: acquiring position information of the eyeball gaze point on the display screen, namely, acquiring the position coordinate $(x_1, y_1)$ information of the eyeball gaze point on the screen, wherein x may be the horizontal direction, y may be the vertical direction, and $x_1$ and $y_1$ are respectively the coordinates in the horizontal direction and in the vertical direction. Then, a cursor on the display screen is controlled to move to a position corresponding to the position information of the gaze point.

When the input instruction that is determined according to a preset eyeball gaze point movement trajectory instructs a confirmation, a confirming operation is executed to a content corresponding to the position of the cursor according to the input instruction, such as clicking a button. When the input instruction instructs to cancel, a cancelling operation is executed to a content corresponding to the position of the cursor according to the input instruction, such as cancelling a dialog box. Thereby, input operations such as confirming or cancelling a content can be realized, and input operations can be completed without using external input devices, and the input efficiency is improved.

Accordingly, the technical solution of realizing input by using the eyeball tracking technique of the embodiments of the present disclosure has the advantage of high input efficiency, it can input instructions by merely detecting and identifying the eye gesture operations of the user, which facilitates the use and improves the input efficiency of the device compared with input modes that require external input devices. Furthermore, by presetting specific eye gesture operations, and effectively distinguishing the activities of the eyeball gaze point of the user in the normal state from the purposeful movements of the eyeball gaze point for input operations, the technical solution ensures the accuracy of inputting instructions, and improves the user experience of the device.

Figure 3:
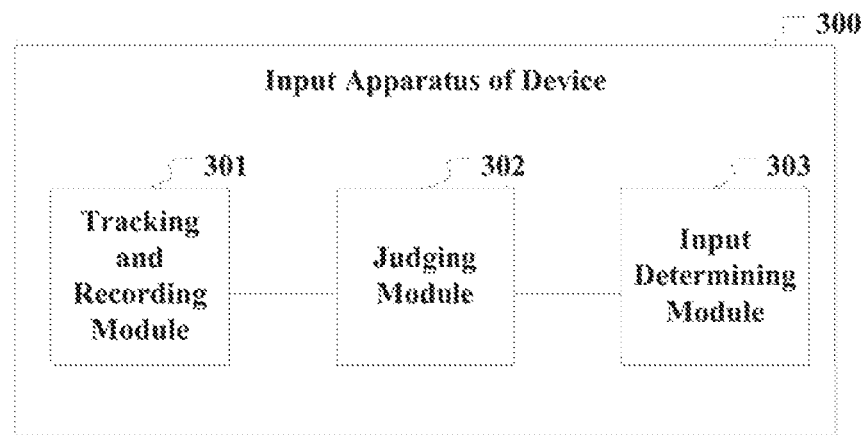
FIG. 3 is a functional block diagram of an input apparatus of a device in accordance with an embodiment of the present disclosure.

The embodiments of the present disclosure further provide an input apparatus of a device. FIG. 3 is a functional block diagram of an input apparatus of a device in accordance with an embodiment of the present disclosure. As shown in FIG. 3, the input apparatus 300 of a device comprises:

a tracking and recording module 301, adapted for tracking and recording movement of an eyeball gaze point of a user on a display screen of the device, to obtain a current eyeball gaze point movement trajectory;

a judging module 302, adapted for judging whether the current eyeball gaze point movement trajectory matches with a preset eyeball gaze point movement trajectory in a movement trajectory database; wherein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories corresponds to an input instruction respectively; and an input determining module 303, adapted for, if the current eyeball gaze point movement trajectory matches with a preset eyeball gaze point movement trajectory, determining a corresponding input instruction by using the matched eyeball gaze point movement trajectory, and completing an input operation according to the input instruction; and if the current eyeball gaze point movement trajectory does not match with the preset eyeball gaze point movement trajectories, not conducting an input operation.

The device of the present embodiment is, for example, a virtual reality device, and the apparatus is applied to the virtual reality device.

In some embodiments of the present disclosure, the movement trajectory database includes preset eyeball gaze point straight movement trajectory; and the preset eyeball gaze point straight movement trajectory comprises: a path indicating that the eyeball gaze point moves out of a first preset range defined by a first preset radius length in a straight line from a current point on the display screen and moves back to a second preset range defined by a second preset radius length within a preset time period. The second preset radius length is less than the first preset radius length, and the current point is a circle center of both the first preset range and the second preset range.

In some other embodiments of the present disclosure, the movement trajectory database includes a preset eyeball gaze point curved movement trajectory; and the preset eyeball gaze point curved movement trajectory comprises: a path indicating that the eyeball gaze point moves from a current point on the display screen in a predefined curve within a preset time period.

In some embodiments of the present disclosure, the preset direction is one of the directions defined as follows:

a positive direction of a horizontal axis, a negative direction of a horizontal axis, a positive direction of a vertical axis and a negative direction of a vertical axis in a rectangular plane coordinate system established by using the display screen as a reference plane and the current point as an origin; and an inclined direction that forms a preset threshold angle with the horizontal axis or the vertical axis of the rectangular plane coordinate system.

The first preset radius length and the second preset radius length are numbers of pixels that are determined according to a field of view of the display screen of the device, a corresponding preset sight line angle and a resolution of the display screen. The preset sight line angle refers to a sight line angle formed when moving a distance of the preset radius length from the current point on the display screen in a preset direction.

Figure 4:
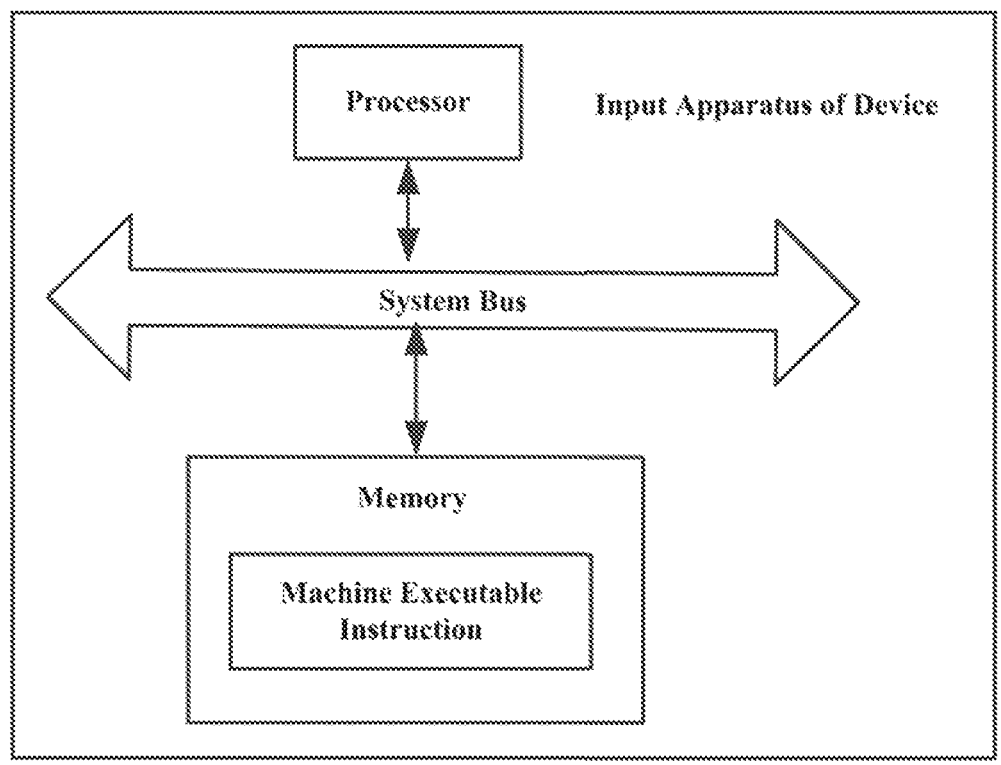
FIG. 4 is a structural block diagram of an input apparatus of a device in accordance with an embodiment of the present disclosure.

The embodiments of the present disclosure further provide an input apparatus of a device. FIG. 4 shows a structural block diagram of the input apparatus of a device of the present disclosure. Besides the processor and memory shown in FIG. 4, according to the requirements of practical functions of the input apparatus of a device of the present disclosure, the apparatus may also comprise other hardware, which is not discussed here in detail.

In FIG. 4, the memory stores a machine executable instruction code. The processor communicates with the memory, reads and executes the instruction code stored in the memory, to implement the input operations of the device that are disclosed by the above examples of the present disclosure. The input operations of the device to be implemented comprise:

tracking and recording movement of an eyeball gaze point of a user on a display screen of the device, to obtain a current eyeball gaze point movement trajectory;

judging whether the current eyeball gaze point movement trajectory matches with a preset eyeball gaze point movement trajectory in a movement trajectory database; wherein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories respectively corresponds to an input instruction;

if the current eyeball gaze point movement trajectory matches with a preset eyeball gaze point movement trajectory, determining a corresponding input instruction by using the matched eyeball gaze point movement trajectory, and completing an input operation according to the input instruction; and if the current eyeball gaze point movement trajectory does not match with the preset eyeball gaze point movement trajectories, not conducting an input operation.

In some embodiments of the present disclosure, the movement trajectory database includes preset eyeball gaze point straight movement trajectory; and the preset eyeball gaze point straight movement trajectory comprises a path indicating that the eyeball gaze point moves out of a first preset range defined by a first preset radius length in a straight line from a current point on the display screen and moves back to a second preset range defined by a second preset radius length within a preset time period. The second preset radius length is less than the first preset radius length, and the current point is a circle center of both the first preset range and the second preset range.

In some embodiments of the present disclosure, the movement trajectory database includes a preset eyeball gaze point curved movement trajectory; and the preset eyeball gaze point curved movement trajectory comprises a path indicating that the eyeball gaze point moves from a current point on the display screen in a predefined curve within a preset time period.

In some embodiments of the present disclosure, the preset direction is one of the directions that are defined as follows: a positive direction of a horizontal axis, a negative direction of a horizontal axis, a positive direction of a vertical axis and a negative direction of a vertical axis in a rectangular plane coordinate system established by using the display screen as a reference plane and the current point as an origin; and an inclined direction that forms an angle in a preset direction with the horizontal axis or the vertical axis of the rectangular plane coordinate system.

The first preset radius length and the second preset radius length are numbers of pixels that are determined according to a field of view of the display screen of the device, a corresponding preset sight line angle and a resolution of the display screen. The preset sight line angle refers to a sight line angle formed when moving a distance of the preset radius length from the current point on the display screen in a preset direction.

In some embodiments of the present disclosure, the input instruction comprises a confirmation instruction and a cancellation instruction, and the step of implementing input operation of the device by the processor further comprises the step of: acquiring a position information of the eyeball gaze point on the display screen; controlling a cursor on the display screen to move to a position corresponding to the position information of the gaze point; and when the input instruction instructs a confirmation, executing a confirming operation to a content corresponding to the position of the cursor according to the input instruction, and when the input instruction instructs to cancel, executing a cancelling operation to a content corresponding to the position of the cursor according to the input instruction.

Herein, the memory may be any electronic, magnetic, optical or other physical storage devices, and may contain or store information such as executable instructions, data and so on. For example, the machine readable storage medium may be a RAM (Radom Access Memory), a volatile memory, a nonvolatile memory, a flash memory, a storage driver (such as a hard disk drive), a solid state disk, any type of memory discs (such as an optical disk, DVD and so on), or other similar storage media, or any combination thereof.

As the apparatus embodiments basically correspond to the method embodiments, the relevant parts can refer to the description of the method embodiments. The apparatus embodiments described above are merely illustrative, and a person skilled in the art may select part of or all of their modules according to actual demands to achieve the objects of the technical solution of the present embodiments. A person skilled in the art can understand and implement the technical solutions without paying creative work.

In conclusion, the input method and apparatus of a device of the embodiments of the present disclosure can achieve the advantageous effects of improving the efficiency of the input operations, ensuring input accuracy, satisfying the user demands and improving the market competitiveness of the device.

The above only describes specific embodiments of the present disclosure. By the teaching of the present disclosure, a person skilled in the art can make other modifications or variations on the basis of the above embodiments. A person skilled in the art should appreciate that, the above specific descriptions are only for the purpose of better explaining the present disclosure, and the protection scope of the present disclosure should be subject to the protection scope of the claims.

What is claimed is:

1. An input method of a device, comprising the steps of:
    tracking and recording movement of an eyeball gaze point of a user on a display screen of the device, to obtain a current eyeball gaze point movement trajectory;
    judging whether the current eyeball gaze point movement trajectory matches with a preset eyeball gaze point movement trajectory in a movement trajectory database; wherein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories corresponds to an input instruction respectively;

if the current eyeball gaze point movement trajectory matches with a preset eyeball gaze point movement trajectory, determining a corresponding input instruction by using the matched eyeball gaze point movement trajectory, and completing an input operation according to the input instruction; and if the current eyeball gaze point movement trajectory does not match with the preset eyeball gaze point movement trajectories, not conducting an input operation;

wherein the input instruction comprises a confirmation instruction and a cancellation instruction, and the method further comprises the steps of:

acquiring a position information of the eyeball gaze point on the display screen;

controlling a cursor on the display screen to move to a position corresponding to the position information of the gaze point; and when the input instruction instructs a confirmation, executing a confirming operation to a content corresponding to the position of the cursor according to the input instruction, and when the input instruction instructs a cancellation, executing a cancelling operation to a content corresponding to the position of the cursor according to the input instruction.

2. The method according to claim 1, wherein the movement trajectory database includes a preset eyeball gaze point straight movement trajectory; and the preset eyeball gaze point straight movement trajectory comprises a path indicating that the eyeball gaze point moves out of a first preset range defined by a first preset radius length from a current point on the display screen in a preset direction and in a straight line and moves back to a second preset range defined by a second preset radius length within a preset time period, the second preset radius length is less than the first preset radius length, and the current point is a circle center of both the first preset range and the second preset range.

3. The method according to claim 2, wherein the preset direction is one of the directions that are defined as follows:

a positive direction of a horizontal axis, a negative direction of a horizontal axis, a positive direction of a vertical axis and a negative direction of a vertical axis in a rectangular plane coordinate system established by using the display screen as a reference plane and the current point as an origin; and an inclined direction that forms an angle in a preset direction with the horizontal axis or the vertical axis of the rectangular plane coordinate system.

4. The method according to claim 2, wherein the first preset radius length and the second preset radius length are numbers of pixels that are determined according to a field of view of the display screen of the device, a corresponding preset sight line angle and a resolution of the display screen; the preset sight line angle refers to a sight line angle formed when moving a distance of the preset radius length from the current point on the display screen in a preset direction.

5. The method according to claim 1, wherein the movement trajectory database includes a preset eyeball gaze point curved movement trajectory; and the preset eyeball gaze point curved movement trajectory comprises a path indicating that the eyeball gaze point moves from a current point on the display screen in a predefined curve within a preset time period.

6. An input apparatus of a device, comprising:

a tracking and recording module, adapted for tracking and recording movement of an eyeball gaze point of a user on a display screen of the device, to obtain a current eyeball gaze point movement trajectory;

a judging module, adapted for judging whether the current eyeball gaze point movement trajectory matches with a preset eyeball gaze point movement trajectory in a movement trajectory database; wherein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories corresponds to an input instruction respectively; and an input determining module, adapted for, if the current eyeball gaze point movement trajectory matches with a preset eyeball gaze point movement trajectory, determining a corresponding input instruction by using the matched eyeball gaze point movement trajectory, and completing an input operation according to the input instruction; and if the current eyeball gaze point movement trajectory does not match with the preset eyeball gaze point movement trajectories, not conducting an input operation;

wherein the input instruction comprises a confirmation instruction and a cancellation instruction, and the input determining module is further adapted for:

acquiring a position information of the eyeball gaze point on the display screen;

controlling a cursor on the display screen to move to a position corresponding to the position information of the gaze point; and when the input instruction instructs a confirmation, executing a confirming operation to a content corresponding to the position of the cursor according to the input instruction, and when the input instruction instructs a cancellation, executing a cancelling operation to a content corresponding to the position of the cursor according to the input instruction.

7. The apparatus according to claim 6, wherein the movement trajectory database includes a preset eyeball gaze point straight movement trajectory; and the preset eyeball gaze point straight movement trajectory comprises a path indicating that the eyeball gaze point moves out of a first preset range defined by a first preset radius length from a current point on the display screen in a preset direction and in a straight line and moves back to a second preset range defined by a second preset radius length within a preset time period, the second preset radius length is less than the first preset radius length, and the current point is a circle center of both the first preset range and the second preset range.

8. The apparatus according to claim 7, wherein the preset direction is one of the directions that are defined as follows:

a positive direction of a horizontal axis, a negative direction of a horizontal axis, a positive direction of a vertical axis and a negative direction of a vertical axis in a rectangular plane coordinate system established by using the display screen as a reference plane and the current point as an origin; and an inclined direction that forms an angle in a preset direction with the horizontal axis or the vertical axis of the rectangular plane coordinate system; and the first preset radius length and the second preset radius length are numbers of pixels that are determined according to a field of view of the display screen of the device, a corresponding preset sight line angle and a resolution of the display screen; the preset sight line angle refers to a sight line angle formed when moving a distance of the preset radius length from the current point on the display screen in a preset direction.

9. The apparatus according to claim 6, wherein the movement trajectory database includes a preset eyeball gaze point curved movement trajectory; and the preset eyeball gaze point curved movement trajectory comprises: a path indicating that the eyeball gaze point moves from a current point on the display screen in a predefined curve within a preset time period.

10. An input apparatus of a device, comprising a processor and a memory, wherein the memory stores machine executable instruction code, and the processor communicates with the memory, and reads and executes the instruction code stored in the memory, to implement the following input operation of the device:

tracking and recording movement of an eyeball gaze point of a user on a display screen of the device, to obtain a current eyeball gaze point movement trajectory;

judging whether the current eyeball gaze point movement trajectory matches with a preset eyeball gaze point movement trajectory in a movement trajectory database; wherein the preset eyeball gaze point movement trajectories indicate paths of the movement of the eyeball gaze point on the display screen according to a preset length range within a preset time period, the movement trajectory database includes a plurality of preset eyeball gaze point movement trajectories, and each of the preset eyeball gaze point movement trajectories corresponds to an input instruction respectively;

if the current eyeball gaze point movement trajectory matches with a preset eyeball gaze point movement trajectory, determining a corresponding input instruction by using the matched eyeball gaze point movement trajectory, and completing an input operation according to the input instruction; and if the current eyeball gaze point movement trajectory does not match with the preset eyeball gaze point movement trajectories, not conducting an input operation;

wherein the input instruction comprises a confirmation instruction and a cancellation instruction, and the step of implementing input operation of the device by the processor further comprises the steps of:

acquiring a position information of the eyeball gaze point on the display screen;

controlling a cursor on the display screen to move to a position corresponding to the position information of the gaze point; and when the input instruction instructs a confirmation, executing a confirming operation to a content corresponding to the position of the cursor according to the input instruction, and when the input instruction instructs to cancel, executing a cancelling operation to a content corresponding to the position of the cursor according to the input instruction.

11. The apparatus according to claim 10, wherein the movement trajectory database includes a preset eyeball gaze point straight movement trajectory; and the preset eyeball gaze point straight movement trajectory comprises a path indicating that the eyeball gaze point moves out of a first preset range defined by a first preset radius length from a current point on the display screen in a preset direction and in a straight line and moves back to a second preset range defined by a second preset radius length within a preset time period, the second preset radius length is less than the first preset radius length, and the current point is a circle center of both the first preset range and the second preset range.

12. The apparatus according to claim 11, wherein the preset direction is one of the directions that are defined as follows:

a positive direction of a horizontal axis, a negative direction of a horizontal axis, a positive direction of a vertical axis and a negative direction of a vertical axis in a rectangular plane coordinate system established by using the display screen as a reference plane and the current point as an origin; and an inclined direction that forms an angle in a preset direction with the horizontal axis or the vertical axis of the rectangular plane coordinate system; and wherein the first preset radius length and the second preset radius length are numbers of pixels that are determined according to a field of view of the display screen of the device, a corresponding preset sight line angle and a resolution of the display screen; the preset sight line angle refers to a sight line angle formed when moving a distance of the preset radius length from the current point on the display screen in a preset direction.

13. The apparatus according to claim 10, wherein the movement trajectory database includes a preset eyeball gaze point curved movement trajectory; and the preset eyeball gaze point curved movement trajectory comprises a path indicating that the eyeball gaze point moves from a current point on the display screen in a predefined curve within a preset time period.

* * * * *